3,448,562
GAS TREATING APPARATUS AND METHOD
Walter L. Wisting, Madison, Conn., assignor to Wallace-Murray Corporation, New York, N.Y., a corporation of Delaware
Continuation-in-part of application Ser. No. 501,025, Oct. 22, 1965. This application July 25, 1967, Ser. No. 660,158
Int. Cl. B01d 47/12, 47/06
U.S. Cl. 55—90                    18 Claims

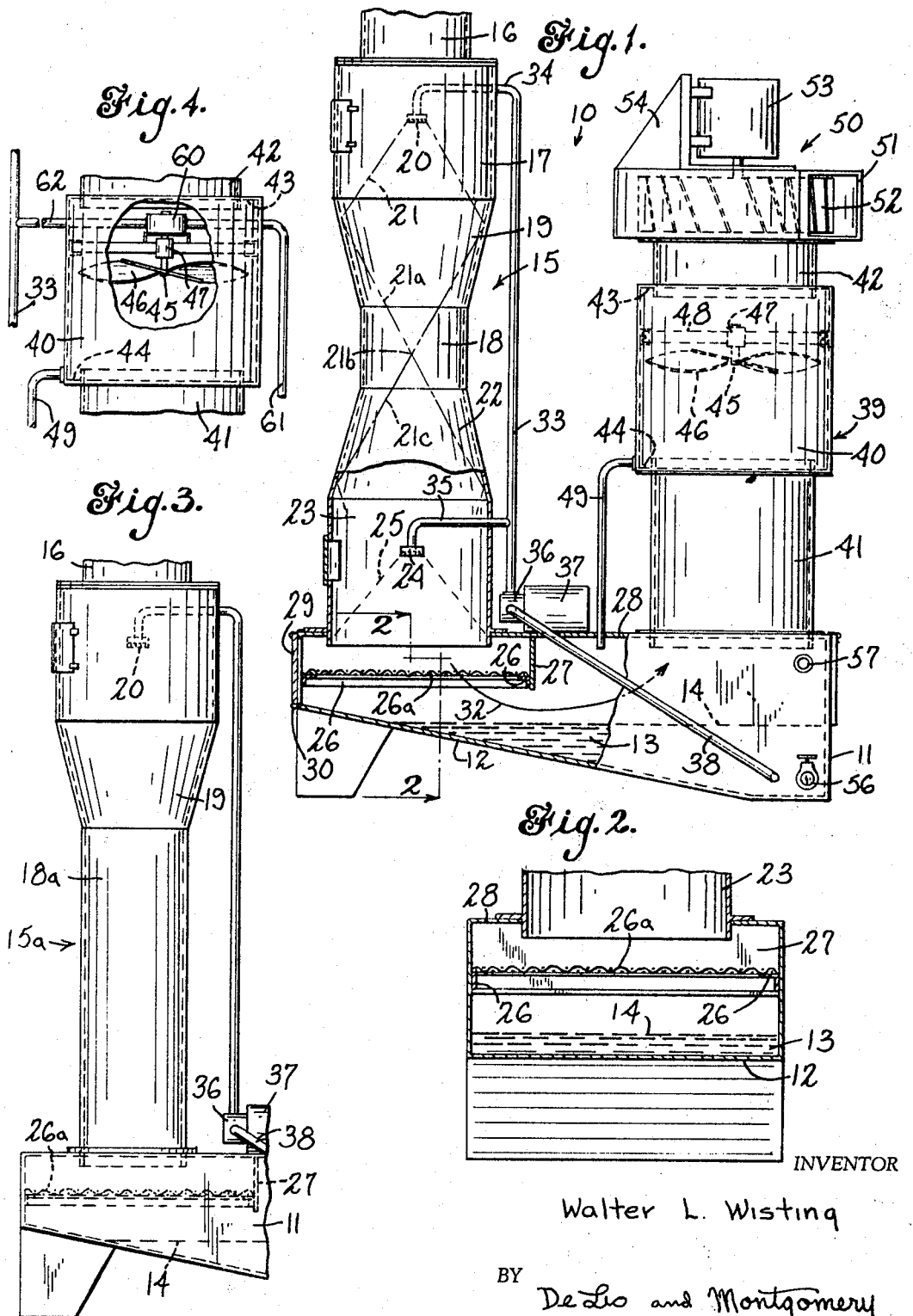

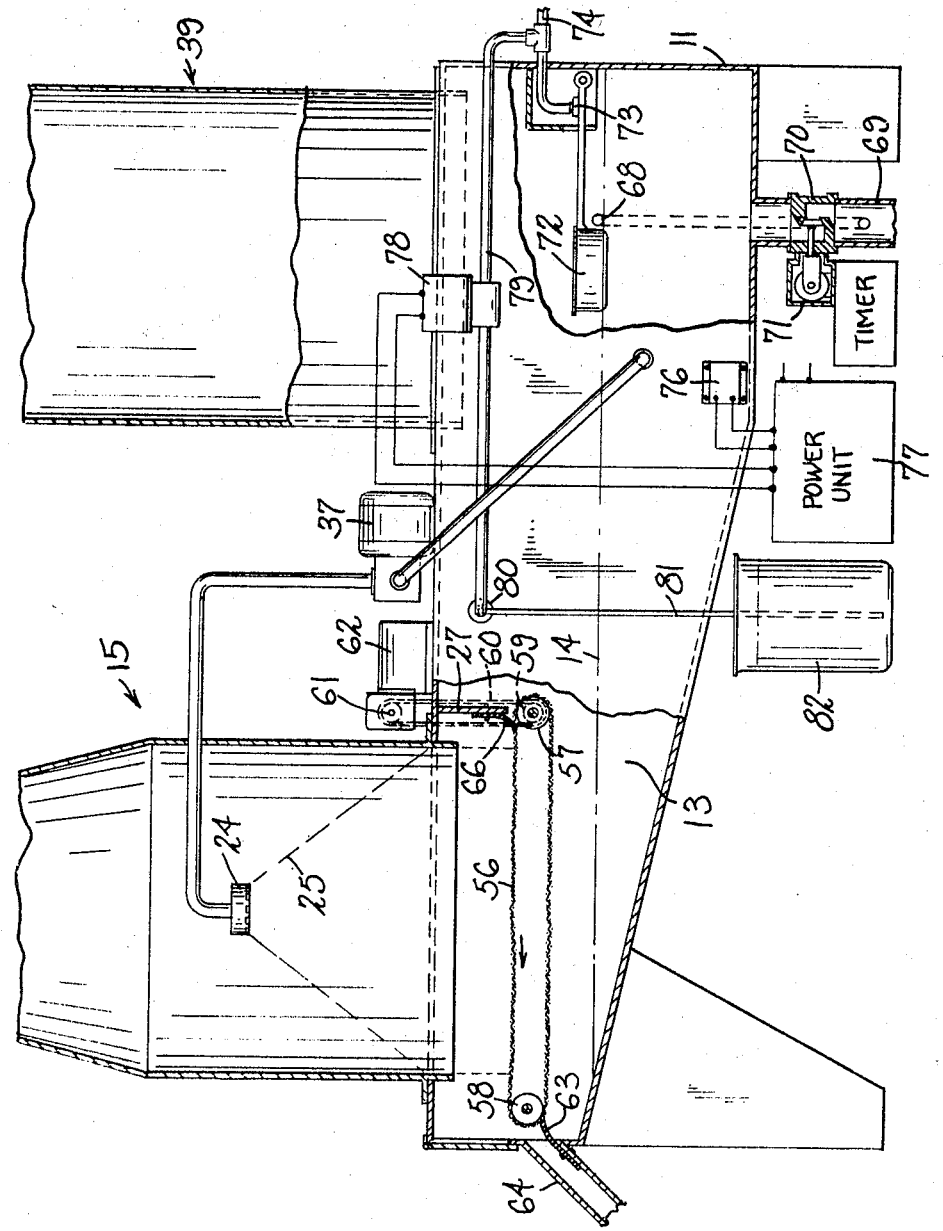

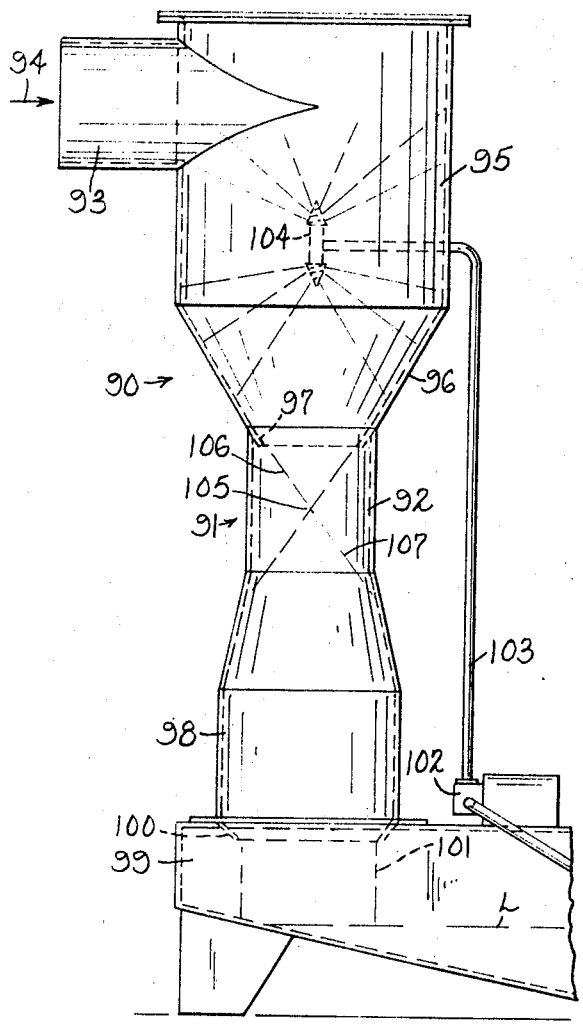
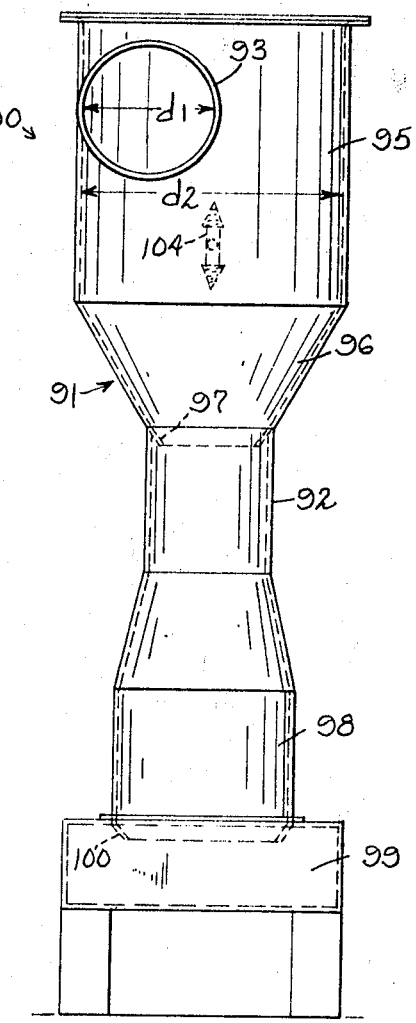

ABSTRACT OF THE DISCLOSURE

This disclosure relates to a gas treating apparatus comprising a conduit having a central portion of lesser transverse dimension than the remainder of the conduit, where the central portion is sized for a predetermined gas flow. The walls of the conduit are contoured to direct gas flow into the conduit towards the axis thereof. Liquid sprayed onto the walls of the conduit from a nozzle prior to the central portion is entrained in the directed gas flow so as to form a generally conical secondary screen of liquid across the conduit which converges at the center of the conduit and diverges thereafter to form another screen of liquid through which the gas stream must flow.

---

This application is a continuation-in-part of copending application Ser. No. 501,025, filed Oct. 22, 1965 and now abandoned.

This invention relates to air treating apparatus, and more particularly relates to apparatus for removing contaminants from air or a gas using a wetting agent, such as water, which is subsequently removed from the exiting air or gas.

The present invention is particularly adaptable for use in removing contaminants from air such as grinding dust and particles which may vary from micron size to a relatively large size. This invention provides a new and improved technique for wetting airborne contaminants in which the wetting agent, usually water, is repeatedly exposed in substantially uniform dispersion to the incoming contaminated air stream. Due to this greater exposure of the air to the water, a more efficient air washing or scrubbing action is attained. The invention further provides new and improved means for collecting and wetting down larger size particles of the contaminants removed from the air and further includes new and improved means for removing moisture particles from the scrubbed air before the air is discharged from the apparatus.

Apparatus embodying the invention is constructed and arranged to maximize utilization of the washing water so that a given volume or quantity of water is utilized to create a plurality of washing or scrubbing screens through which the air to be washed must pass. Apparatus embodying the invention is further constructed and arranged so that the water may be reused and the amount of water consumed by the washing greatly minimized.

Accordingly, an object of this invention is to provide new and improved air treating apparatus designed to remove solid contaminants from air.

Another object of this invention is to provide a device of the type described in which the water is so utilized as to promote maximum exposure of water to incoming air streams to effect a more efficient air washing action while minimizing consumption of water.

A further object of this invention is to provide a device of the type described in which new and improved means are provided for wetting contaminants in air to be washed.

A further object of this invention is to provide a device of the type described including new and improved means for removing moisture particles from the washed or scrubbed air.

A still further object of this invention is to provide a device of the type described including new and improved means for subjecting a gas stream to wet scrubbing action including cyclonic flow thereof.

The features of the invention which are believed to be novel are set forth with particularity and distinctly claimed in the concluding portion of this specification. However, the invention both as to its organization and operation, together with further objects and advantages thereof, may best be appreciated by reference to the following detailed description taken in conjunction with the drawings, in which:

FIG. 1 is an elevation, partly cut away, of one apparatus embodying the invention;

FIG. 2 is a view seen in the plane of line 2—2 of FIG. 1;

FIG. 3 is a fragmentary elevation similar to FIG. 1 showing another embodiment of the invention;

FIG. 4 is a fragmentary elevation of a portion of an air cleaning apparatus showing another embodiment of the invention;

FIG. 5 is an elevation, partly cut away, of another embodiment of the invention;

FIG. 6 is an elevation of still another embodiment of the invention; and

FIG. 7 is a side view of the device of FIG. 6 seen from the left side thereof.

In a preferred embodiment of the invention an air washer generally indicated by the reference numeral 10 comprises a base member 11 which may be of generally rectangular configuration having a sloping bottom wall 12 which defines a liquid reservoir 13 indicated as having liquid therein to the level 14. Mounted vertically on casing 11 and in communication with the interior thereof is an inlet conduit 15 adapted to receive air flow from a duct 16. Conduit 15 comprises a first duct section 17 of generally cylindrical configuration and a second duct portion 18, also of generally cylindrical configuration, but of reduced diameter with respect to duct portion 17. Interposed between duct portion 17 and duct portion 18 is a duct portion 19 of generally frusto-conical shape. A spray nozzle 20 is positioned axially within duct portion 17 and arranged to emit a conical spray or screen of water indicated by the dashed lines 21. Disposed below duct portion 18 is a second frusto-conical duct portion 22 and a cylindrical duct portion 23. It will be understood that the duct portions below portion 18 could be made of the same diameter as portion 18. However, to allow room for a second spray nozzle 24, portion 23 is made of the same diameter as portion 17. Nozzle 24 emits a conical spray of water indicated by the dashed lines 25.

Disposed within casing 11 above the level 14 of the water in reservoir 13 is means in the form of rails 26 which support a screen or grid of mesh material 26a thereon, and a baffle 27 depending from the upper wall 28 of casing 11 and extending thereacross. A door 29 hinged at 30 is provided to allow access to screen 26a.

Water is applied to nozzles 20 and 24 through a manifold 33 and lead pipes 34 and 35 by a pump 36 driven by a motor 37. Pump 33 draws water from reservoir 13 through pipe 38 and applies it under pressure to nozzles 20 and 24.

In operation of the device, as thus far described, the air to be cleaned is drawn through duct 16 into conduit 15 and passes through the conical spray of water 21 in which the contaminated air is exposed to a washing or scrubbing action. In accordance with the invention, the tapering of the walls of portion 19 is so chosen that air flow along the walls of portion 17 continues along the inwardly tapering walls of portion 19 converging toward the axis of conduit 15. This air flow picks up and has entrained therein moisture particles which impinge on the walls of portion 19. The water particles of spray 21, upon striking the walls of portion 19, are broken into smaller particles which tend to bounce or be reflected from the walls and, therefore, have decreased surface tension with the walls. These particles become entrained in the air flow and a second screen of water 21a is produced by the converging air flow toward point 21b within conduit portion 18. The air stream then diverges from point 21b due to the directional components of the velocity thereof to form a third water screen 21c across conduit 15.

It may thus be seen that by the construction and arrangement of conduit 15 a single spray nozzle ultimately produces three screens of water across and extending along the length of conduit 15. This maximizes the dispersion of the water particles and the uniformity thereof in the water screens in conduit 15 and further maintains the water particles in the air stream for a greater length of time, thereby maximizing the scrubbing action to which the incoming air flow is exposed. This, in turn, produces a more efficient wetting of airborne contaminants.

The contaminated air upon reaching duct portion 23 must pass through another primary screen of water 25 emitted by nozzle 24 and is subjected to further washing action. Air entering casing 11 has had great and repeated exposure to the water screens along the length of conduit 15. Contaminants therein, such as grinding dust and particles, have been efficiently wetted. Some wetted particles, dependent on the size thereof, are collected on screen or mesh 26a and the smaller wetted particles continue on through screen 26a to the water in reservoir 13. The wetted contaminant particles, being heavier than air, do not change direction with the air stream and are collected in the water in the reservoir. Almost all water particles in the air stream pass through screen 26a and fall into the reservoir and do not change direction with the air as indicated by arrow 32. Lighter water particles continue in the air stream beneath baffle 27, but are removed therefrom in a manner hereinafter described.

By way of example only, apparatus embodying the invention, as shown in FIG. 1, may have the following dimensions and characteristics.

Conduit 15:
    Portion 17—12" diameter, 10" height.
    Portion 18— 8" diameter, 6" height.
    Portion 19— 8" height.
    Portion 22— 8" height.
    Portion 23—12" diameter, 10" height.
Housing 11:
    Length—40"
    Depth—15" (greatest).
Conduit 39:
    Conduit 41—12" diameter.
    Casing 40—15" diameter.
    Conduit 42—12" diameter.
Blower—1500 c.f.m. or as specified.

This is a relatively small unit as compared to other known air scrubbers, and achieves its efficiency in part by washing at relatively high air velocities.

With this exemplified arrangement, the velocity of the air through portion 18 may be approximately 4000 feet per minute. In portions 17 and 23, the velocity would be on the order of 2000 feet per minute. This high velocity of air flow provides greater dispersion of the water particles in the screens 21, 21b and 21c. Additionally, more uniform dispersion is created and kinetic energy imparted to such water particles. The high kinetic energy of the water particles enables the particles to more efficiently surround and grasp contaminant particles in the incoming air flow.

The increasing velocity of the air flow through portions 19 and 18 causes the convergence of the air streams as represented at point 21b and the subsequent divergence through portion 22 as the velocity decreases.

An outlet conduit 39 is mounted to casing 11 and in open communication therewith. Conduit 39 comprises an annular casing 40 together with inlet and outlet conduits 41 and 42, respectively, which define annular pockets 43 and 44. Rotatively mounted about an axis coaxial with the axis of conduit 39, is a fan 45 having radially extending blades 46 spanning a greater dimension than the diameter of conduits 41 and 42. The shaft of fan 45 is freely rotatable in the hub 47 supported by brackets 48 from the side wall of casing 40. Fan 45 has blades in wide overlapping relationship which define paths therebetween transverse to the axis of the fan, and the air flow impinging thereon will drive the fan at a high speed. The moisture-entrained air striking the fan produces rotation thereof and the moisture particles striking the fan are centrifugally thrown off to the walls of casing 40 and run down to pocket or sump 44 and, hence, through pipe 49 to reservoir 13. Some moisture particles will tend to creep towards outlet conduit 42 into the backwash of fan 45. However, such particles which tend to travel up the sidewall of casing 40 are trapped in pocket 43 and eventually run down the sidewall of casing 40 to sump 44 and, hence, drain back through pipe 49 to reservoir 13.

Air is drawn through the disclosed apparatus by means of a fan or blower assembly 50 mounted to outlet conduit 39. Fan or blower assembly 50 comprises a housing member 51 adapted to be received on member 42, a fan 52 and drive motor 53 therefor mounted on a bracket 54. Fan 52 is rotatably mounted within housing 51 and draws air through duct 16, conduit 15, through screen 26a below baffle 27, and through conduit 39.

The blower is so selected in accordance with the diameter of duct portion 18 as to produce a given velocity of air through duct portion 18 which will not build up an undesired static head of pressure at fan 45. The velocity of the air through duct 18 is substantially the same as the velocity through connecting duct 16, and therefore there is no static pressure drop due to constriction of conduit 15. However, it may be noted that duct portion 17 is enlarged with respect to duct portion 18. This is to allow provision for placement of nozzle 20 therein and also to provide the differences in diameter between duct portions 18 and 17 to provide the reflective and air directing sidewall of duct portion 19.

The free wheeling fan 46 also provides a stabilizing function when blower fan 52 reaches its greatest speed under load conditions. Fan 46 will maintain an essentially constant speed which will prevent surges of the incoming air through the unit. This will prevent any surging effect, and aid in maintaining a substantially constant volumetric air flow through the air washer.

In some instances it may not be desired to include the spray nozzle 24, and in such cases the duct portions below portion 18 may be made of substantially uniform diameter as shown in FIG. 3. In FIG. 3 there is shown an inlet duct 15a which might be substituted for conduit 15 of FIG. 1. It will be noted that the only difference between conduit 15a of FIG. 3 and conduit 15 of FIG. 1 is that conduit portion 18a is of substantially constant diameter below duct portion 19 and spray nozzle 24 is removed. Otherwise, the operation of apparatus using inlet conduit 15a is the same as that of the apparatus using inlet conduit 15.

The disclosed apparatus is effective in removing contaminant particles of micron size and above. If the apparatus is to treat air having sub-micron contaminant particles therein, the conduit 39 may be replaced with the air washer unit disclosed in the copending application of Walter L. Wisting, Ser. No. 456,432, filed May 17, 1965, and assigned to the same assignee as the present invention.

The air treating device 10, FIG. 1, is provided with a drain 56 at the bottom of casing 11 and also an inlet pipe 57 in the sidewall thereof. If desired, the water in reservoir 13 may be drawn off and replaced at a uniform rate by use of a float valve and overflow drain as disclosed in the aforementioned copending application.

In another embodiment of the invention, shown in FIG. 4, a pump 60 is driven by the shaft of fan 45 within casing 40. Pump 60 draws water from reservoir 13 through pipe 61 and supplies water under pressure through pipe 62 to manifold 33. In this embodiment the motor 37 is eliminated and the air flow impinging upon the blades 46 of fan 45 drives pump 60. This, of course, decreases the speed of rotation of fan 45 but such decrease is insufficient to effect the moisture removal action of fan 45.

Another embodiment of the invention is shown in FIG. 5 which provides for continuous removal of larger contaminant particles removed from the incoming air stream. The apparatus of FIG. 5 is further arranged for continuous change of the water in reservoir 13 and also illustrates facility for neutralizing an undesired condition, such as acidity in the incoming air stream. In FIG. 5 like parts to those shown in FIG. 1 bear like identifying reference numerals. In the apparatus of FIG. 5, the screen 26a is replaced by a continuous mesh belt 56 which in one form may be of polyvinyl chloride or other chemically resistant material. Belt 56 is mounted about rollers 57 and 58 rotatably mounted in bearings (not shown) carried on the side walls of housing 11. Roller 57 is driven by means of a pulley or wheel 59 on the shaft thereof, in turn driven by a belt 60 on the pulley 61 of a gear head motor 62. Belt 56 moves at a slow speed collecting the larger contaminant particles exiting through conduit 15 about roller 58. Such collected contaminants are removed from belt 56 at wiper 63 through a discharge conduit 64 which leads to a suitable collection point such as a barrel or other container (not shown).

Another wiper 66 is carried by baffle 27 primarily as a sealing means to insure that the air passes through mesh 56 and any contaminants therein are collected on mesh 56. The heavier water particles then fall into the reservoir and the air changes direction and exits through outlet duct 39 as previously described.

The reservoir is also provided with an overflow pipe 68 leading to a drain 69 and bypassing drain valve 70. Drain valve 70 may be arranged to be opened periodically for a predetermined interval of time by a timing motor 71 which may open valve 70 for a period of a few seconds, say, every one-half hour or hour to allow accumulated foreign matter in casing 11 to be drained off. As the water level 14 in casing 11 decreases, such decrease is sensed by a float 72. As float 72 senses a falling of level 14, it opens a valve 73 to admit fresh water from an inlet line 74. In this manner, the water in reservoir 13 may be changed at a controlled rate, and the contaminant particles which fall through screen 56 and settle on the bottom of casing 11 may be drained off.

The apparatus of FIG. 5 is further provided with means for neutralizing an undesired condition, for example, acidity of the water in the sump. A sensing device to sense such undesired condition, such as a conductivity cell 76 is mounted to housing 11 to sense the acidity of the water therein. When a predetermined degree of acidity is sensed a signal of predetermined magnitude is applied to a power unit 77 which energizes a solenoid 78 in line 79 from supply line 74. Water from the supply source then travels through lines 74 and 79 to an atomizing valve 80 which also receives a line 81 from a source 82 of an acid-neutralizing reagent. As the water flows under pressure through line 79 to the atomizing orifice (not shown) of valve 80 the pressure therein is reduced and a reacting agent is drawn through line 81 and mixed with the water in valve 80, and such mixture is then discharged into the water in housing 11. The reacting agent will then neutralize the acidic tendency of the water in sump 13 and prolong the useful life thereof. A suitable system, such as that described which includes a conductivity cell, control valve, atomizing valve and power unit is available from Economics Laboratory, Inc. of St. Paul, Minn. and is identified by the trademark Sol-U-Matic 24 Electronic Dispenser. It is to be understood that the example of the undesired condition being one of acidity is for exemplary purposes only and the neutralizing system may be used for other purposes, such as to inject a solvent to dissolve grease.

From the foregoing it is believed to be apparent that an efficient air washer or scrubber has been provided which introduces essentially no static pressure drop into the system and which requires no static filters. Larger size contaminants depending upon the nature thereof, may be removed from the housing 11 either by removing the screen or by utilizing a moving screen as shown in the embodiment of FIG. 5. Moreover, the water in reservoir 13 may be changed at a controlled rate and periodically dumped dependent upon operating conditions.

Another embodiment of the invention is illustrated in FIGS. 6 and 7. This embodiment operates on the same principle as that previously described with the addition of a cyclonic swirling action at the input. The device 90 of FIGS. 6 and 7 comprises an inlet convergence tube 91 which includes an intermediate portion 92 having a diameter or cross-sectional area which is substantially the same as an inlet duct 93 which receives gas flow indicated by the arrow 94. The input duct directs gas flow tangentially into a cylindrical housing 95. The lower edge of housing 95 is joined to portion 92 by means of a conical section 96 which may have a lip 97 extending part way into portion 92. Below portion 92 the conduit diverges in portion 97a to cylindrical portion 98 which provides communication between conduit 91 and a housing 99. A baffle-like member 100 may be provided to spread liquid particles running down the inside wall of tube 91 into a uniform screen 101 falling into housing 99. Housing 99 defines a liquid reservoir or sump having a liquid level L which may be controlled in a manner previously described. A motor driven pump 102 supplies liquid from housing 99 to a manifold 103 and, hence, to a spray nozzle 104 disposed in housing portion 95. Nozzle 104 is shown as a double-ended nozzle which directs sprays of liquid to the walls of conduit 91, particularly the walls of housing 95 and section 96.

Preferably mounted to housing 99 and in communication therewith is an outlet conduit similar to conduit 39 shown in FIG. 1 having a blower thereon (not shown in FIGS. 6 and 7). When gas to be treated is drawn into housing 95 it enters tangentially and moves in a helical path downwardly of conduit 91. The liquid spray directed onto the walls of section 96 wets the interior walls of housing 95 and also some of the liquid particles are entrained in the helical air flow descending downwardly of housing portion 95. This helical air flow tends to throw heavier contaminant particles to the walls where such particles are wetted and thus removed from the air stream. As the gas flow descends into section 96 it takes on a spiraling as well as helical flow and with the entrained liquid therein creates a swirling or spiraling helical flow of liquid along the walls of section 96. This helical spiral continues into section 92 and produces an agglomeration of liquid and gas in section 92 substantially at the apex 105. This phenomenon further creates the generally conically illustrated screen of liquid 106 across conduit 91 in section 92 through which the air must pass and be subjected to a further scrubbing action.

Then as the air flow or the gas flow wurther descends in conduit 91 the spiraling helical liquid diverges into another screen, as represented by the dashed lines 107, to produce a further screen of liquid across conduit 91 through which the gas flow must pass. Thereafter, the liquid falls into housing 99 as represented by the screen 101 and the gas flow passes therethrough to the outer conduit as previously described.

It has been determined that the scrubbing action to which the gas is subjected in conduit 91 is extremely efficient and produces multiple and very thorough scrubbing of the gas with the liquid screens created by the nozzle 104, the secondary screens produced by the construction of conduit 91 and further the centrifugal separating phenomenon which takes place principally in sections 95 and 96. The screens of liquid 106 and 107 created in conduit 91 are similar to the screens 21a and 21c created in the apparatus of FIG. 1, the difference being that in the apparatus of FIGS. 6 and 7 these liquid screens have a swirling or horizontal component of motion as well as a vertical component.

To establish the helical gas flow in the upper portion of conduit 91, the dimension D1 across inlet duct 94 is maintained at no more than one-half of the dimension D2 across housing 95. In this manner helical flow of the incoming gas stream may be established and maintained.

It may thus be seen that the objects of the invention set forth above as well as those made apparent from the preceding description are efficiently attained. While preferred embodiments of the invention have been set forth for purposes of disclosure, other embodiments of the invention as well as modifications to the disclosed embodiments thereof may occur to those skilled in the art. Accordingly, the appended claims are intended to cover all embodiments of the invention and modifications thereof which do not depart from the spirit and scope of the invention.

What is claimed is:

1. Air treating apparatus comprising housing means defining a liquid reservoir, an inlet conduit positioned on said housing and being in open communication therewith, an outlet conduit positioned on said housing and being in open communication therewith, liquid spray means positioned in said inlet conduit and arranged to emit a spray of liquid into an incoming air stream, a screen supported in said housing below said inlet conduit extending across said housing, a baffle depending from the top wall of said housing to said screen and extending across said housing so that air flow entering said housing passes through said screen and beneath said baffle to said outlet conduit, said outlet conduit comprising a casing having an inlet opening and an outlet opening, a moisture eliminator fan rotatably mounted in said casing in front of said outlet opening, said fan having radially extending blades spanning a dimension greater than the dimension across said outlet opening, said inlet opening being defined by a first duct of lesser dimension than said casing extending into said casing and defining an annular sump therewith at one end thereof and the other end thereof being in open communication with the interior of said housing, means for drawing liquid from said reservoir and supplying the drawn liquid to said spray means, and means for moving air to be treated through said apparatus, said fan being driven by the air flow through said outlet conduit and effective to centrifugally throw moisture particles impinging thereon onto the wall of said casing, a pipe providing communication between said annular sump and said housing so that the water thrown from said fan drains to said housing from said sump.

2. The apparatus of claim 1 wherein said means for drawing liquid comprises a pump driven by said fan.

3. Air treating apparatus comprising housing means defining a liquid reservoir, an inlet conduit positioned on said housing and being in open communication therewith, said inlet conduit having a first portion and a second portion of reduced diameter with respect to said first portion, said first portion including a portion connecting to said second portion and being so shaped that air flow along the walls thereof is directed towards the axis of said conduit, an outlet conduit positioned on said housing and being in open communication therewith, liquid spray means positioned in said first portion and arranged to emit a generally annular spray of liquid onto the walls of said first portion, said outlet conduit comprising a casing having an inlet opening and an outlet opening, a moisture eliminator fan rotatably mounted in said casing in front of said outlet opening, said fan having radially extending blades spanning a dimension greater than the dimension across said outlet opening, said inlet opening being defined by a conduit of lesser dimension than said casing extending into said casing and defining an annular sump therewith at one end thereof and the other end thereof being in open communication with the interior of said housing, means for drawing liquid from said reservoir and supplying the drawn liquid to said spray means, and means for moving air to be treated through said apparatus, said fan being driven by the air flow through said outlet conduit and effective to centrifugally throw moisture particles impinging thereon on to the wall of said casing, and means providing communication between said annular sump and said housing so that the water thrown from said fan drains to said housing from said sump.

4. Gas treating apparatus comprising housing means defining a liquid reservoir, a vertical conduit mounted on said housing means and communicating with the interior thereof, an outlet conduit mounted on said housing and communicating with the interior of said housing, means for moving gas to be treated through said apparatus, said inlet conduit having a generally cylindrical inlet portion and a second subsequent portion of reduced diameter, a third portion between said inlet portion and said portion of reduced diameter, said third portion being so contoured along its length that gas flow along the walls thereof is directed toward the axis of said inlet conduit, liquid spray means in said conduit arranged to direct a screen of liquid across said conduit onto the walls of said conduit prior to said second portion, a fourth portion below said second portion of greater diameter than said second portion, an inlet duct communicating with said inlet conduit and adapted to direct gas flow therein, said inlet duct being dimensioned with respect to said second portion of reduced diameter so that the velocities of gas flow in said duct and through said portion of reduced diameter are substantially the same, and a second means arranged to direct a screen of water across said conduit in said fourth portion.

5. In a gas treating device adapted to have gas pass therethrough and be subjected to liquid spray, the improvement comprising housing means defining a liquid reservoir, a casing having a lower inlet opening and an upper outlet opening extending vertically from said housing, a moisture eliminator fan rotatably mounted in said casing adjacent said outlet opening, said fan having radially extending blades spanning a dimension greater than the dimension across said outlet opening, said outlet opening being defined by a first conduit of lesser dimension than said casing extending into said casing and defining an annular pocket therewith, said inlet opening being defined by a second conduit extending into said casing, said fan being freely rotatable and arranged to be driven by gas flow through said casing, said casing and said second conduit defining a liquid receiving sump spaced above said housing in open communication with said casing to receive the water thrown from said fan, said second conduit providing open communication between said housing and said casing, a gas intake opening defined in said housing, conduit means providing communication between said annular sump and said housing to permit liquid in said sump to drain to said housing, and means for drawing gas to be treated through said housing and said casing.

6. A method of treating gas which comprises the steps of drawing gas to be treated through a conduit, decreasing the velocity of the gas, directing the gas flow in the conduit toward the axis of the conduit while increasing the velocity thereof, spraying a screen of liquid across the conduit onto the walls of said conduit so that gas through said conduit passes through said screen and liquid impinging on the walls of said conduit is broken into small droplets and entrained in the directed gas flow.

7. A method of treating gas which comprises the steps of drawing gas to be treated through a conduit at a substantially constant volumetric rate, decreasing the velocity of the gas directing the gas flow in the conduit toward the axis of the conduit while increasing the velocity thereof, and spraying a screen of liquid across the conduit onto the walls of said conduit so that gas through said conduit passes through said screen and liquid impinging on the walls of said conduit is broken into small droplets and entrained in the directed gas flow.

8. Gas treating apparatus comprising housing means defining a liquid reservoir, a vertical inlet conduit mounted on said housing means externally thereof and communcating with the interior thereof, an outlet conduit mounted on said housing and communicating with the interior of said housing, liquid spray means arranged to emit a spray of liquid extending across said conduit, a generally planar screen supported in said housing below said inlet conduit extending across said housing to intercept particles above a predetermined size and prevent same from falling into said reservoir, and a baffle extending from the top wall of said housing to said screen so that gas flow entering said housing passes through said screen and beneath said baffle to said outlet conduit, and means for moving gas to be treated through said apparatus.

9. Gas treating apparatus comprising housing means defining a liquid reservoir, a vertical inlet conduit mounted on said housing means externally thereof and communicating with the interior thereof, an outlet conduit mounted on said housing and communicating with the interior of said housing, liquid spray means arranged to emit a spray of liquid extending across said conduit, a screen in the form of a moving belt supported in said housing below said inlet conduit extending across said housing to intercept particles above a predetermined size, a baffle extending from the top wall of said housing to said screen so that gas flow entering said housing passes through said screen and beneath said baffle to said outlet conduit, means for removing particles from said belt, and means for moving gas to be treated through said apparatus.

10. Gas treating apparatus comprising housing means defining a liquid reservoir, a vertical inlet conduit mounted on said housing means and communicating with the interior thereof, means defining a gas outlet from said housing and communicating with the interior of said housing, means for drawing gas through said housing means and said conduits, said inlet conduit having a generally cylindrical inlet portion and a subsequent portion of reduced diameter, a third conduit portion between said inlet portion and said portion of reduced diameter, said third portion being so contoured along its length that the gas flow along the walls thereof is directed toward the axis of said conduit, an inlet duct communicating with said inlet portion and adapted to direct gas flow therein, said inlet duct being dimensioned with respect to said portion of reduced diameter so that the velocities of gas flow in said duct and through said portion of reduced diameter are substantially the same, means for spraying liquid across said conduit onto the walls of said inlet conduit prior to said portion of reduced diameter, and means supplying liquid from said reservoir to said spray means.

11. The apparatus of claim 10 further including means for changing the liquid in said reservoir at a predetermined rate.

12. The apparatus of claim 11 further including means for neutralizing a chemical condition of the water in said reservoir.

13. Air treating apparatus comprising a vertical conduit of generally cylindrical shape, means for drawing air to be treated through said conduit at a substantially constant volumetric rate, said conduit comprising consecutive first, second, third and fourth portions, said first and third portions being of congruent shape with the cross-sectional area of said third portion being smaller than that of said first portion, said second portion joining said first and third portions and having a decreasing cross-sectional area therebetween with the walls thereof directed toward the axis of said conduit, said fourth portion being positioned behind said third portion and having in increasing cross-sectional area along the length thereof, an inlet duct communicating with said first portion and adapted to direct air flow therein, said inlet duct being dimensioned with respect to said portion of reduced diameter so that the velocities of air flow in said duct and through said portion at reduced diameter are substantially the same, liquid spray means positioned in said conduit to direct a screen of liquid across said conduit onto the walls thereof prior to said third portion so that particles of liquid impinging on said walls are entrained in the air flow therealong and create a screen of liquid particles across said conduit which converges toward the axis of said conduit in said third portion and diverges thereafter in said forth portion.

14. Air treating apparatus comprising a conduit of generally cylindrical shape, means for drawing air to be treated through said conduit at a substantially constant volumetric rate, said conduit having a first inlet portion, and a second portion spaced therebehind of smaller cross-sectional area, a third portion joining said first and second portions positioned therebetween and contoured to direct air flow along the walls thereof toward the axis of said conduit at increasing velocity, liquid spray means positioned in said conduit to direct an annular screen of liquid onto the walls of said conduit before said second portion so that the air flow through said conduit passes through said screen and particles of liquid impinging on said walls are entrained in the directed air flow and create a dynamic screen of liquid particles across said conduit which converges in said second portion and diverges thereafter, and an inlet duct communicating with said inlet conduit and adapted to direct gas flow therein, said inlet duct being dimensioned with respect to said second portion of reduced diameter so that the velocities of gas flow in said duct and through said portion of reduced diameter are substantially the same.

15. Gas treating apparatus comprising a hollow generally cylindrical conduit, said conduit having a generally cylindrical inlet portion with subsequent walls contoured to direct gas flow along the walls thereof towards the axis of said conduit in a conduit portion of smaller diameter, said inlet portion having an inlet opening arranged to receive an inlet duct of substantially the same cross-sectional area as said conduit portion of smaller diameter, liquid spray means positioned in said inlet portion and arranged to emit an annular screen of liquid onto the walls of said conduit so that the gas flow through said conduit passes through said screen and particles of liquid impinging on said walls are entrained in the directed gas flow along said walls and converge toward the axis of said conduit, and means for moving gas to be treated through said conduit.

16. The apparatus of claim 15 wherein the walls of said conduit are contoured away from said axis subsequent to said portion of smaller diameter.

17. The apparatus of claim 15 wherein said inlet portion is generally cylindrical in shape through a part of the length thereof and then tapers toward the axis of said coduit, said opening defined in said inlet portion being directed tangentially thereof so that gas entering said conduit initially moves in a helical path in said inlet portion.

18. The apparatus of claim 17 wherein the diameter of said generally cylindrical portion is at least twice as great as the dimension across said opening measured substantially parallel to said diameter.

References Cited

UNITED STATES PATENTS

| | | | |
|---|---|---|---|
| 2,200,891 | 5/1940 | Nyborg | 55—223 |
| 2,484,277 | 10/1949 | Fisher | 55—223 |
| 2,575,359 | 11/1951 | Ortgies | 55—223 |
| 2,935,375 | 5/1960 | Boucher | 55—84 |
| 3,142,548 | 7/1964 | Krantz | 55—89 |
| 2,127,571 | 8/1938 | Pardee | 54—94 |
| 3,284,435 | 11/1966 | McElroy et al. | |

REUBEN FRIEDMAN, *Primary Examiner.*

C. N. HART, *Assistant Examiner.*

U.S. Cl. X.R.

55—94, 248, 259; 261—116, 117